2,862,916

PRODUCTION OF POLYVINYL ALCOHOL

John C. Lukman, Morris Plains, and Orville G. Lowe, Summit, N. J., assignors to Celanese Corporation of America, New York, N. Y., a corporation of Delaware No Drawing. Application August 22, 1955
Serial No. 529,930

3 Claims. (Cl. 260—91.3)

This invention relates to the production of polyvinyl alcohol and relates more particularly to the production of polyvinyl alcohol from polyvinyl esters.

As is well known, polyvinyl alcohol may be prepared from polyvinyl esters, such as polyvinyl acetate, by treating the said polyvinyl acetate to replace the acetate groups by hydroxyl groups. According to one process that has been suggested for this purpose, the polyvinyl acetate is dissolved in a lower aliphatic alcohol and a strongly alkaline substance is added to the solution to catalyze an alcoholysis of the polyvinyl acetate by the alcohol. In present practice, methanol is generally employed as the alcohol to carry out the alcoholysis. Surprisingly, when other lower aliphatic alcohols containing from 2 to 4 carbon atoms, such as ethanol, are employed, the polyvinyl alcohol thus obtained exhibits an objectionable yellow coloration which limits its usefulness for many purposes.

It is an important object of this invention to provide a process for the production of polyvinyl alcohol which will be free from the foregoing and other difficulties.

A further object of this invention is to provide a process for the production of polyvinyl alcohol by the alcoholysis of a polyvinyl ester with a lower aliphatic alcohol containing from 2 to 4 carbon atoms in the presence of an alkaline catalyst which will yield a substantially colorless product.

Other objects of this invention will be apparent from the following detailed description and claims.

It has now been found that the yellow color which develops during the alcoholysis of a polyvinyl ester, such as polyvinyl acetate, with a lower aliphatic alcohol containing from 2 to 4 carbon atoms, such as ethanol, in the presence of an alkaline catalyst arises from small quantities of aldehydes or intermediates or condensation products derived from aldehydes under the conditions of the reaction, hereinafter all referred to collectively as aldehydes, in the reaction mixture. The aldehyde may derive from the alcoholysis of any monomeric vinyl ester, such as vinyl acetate, in the polymer or from aldehyde that is used as a chain transfer agent during the polymerization of the monomeric vinyl ester. It may also derive from reactive groups present in the polyvinyl ester that result in the formation of aldehydes under the conditions of the alcoholysis, or it may be present in the alcohol used to conduct the alcoholysis. Apparently, under the conditions of the reaction, aldehydes, such as acetaldehyde, enter into a color-forming reaction that is responsible for the development of a yellow color in the polyvinyl alcohol. This may be due to repeated aldol condensations of aldehydes containing active hydrogens on the carbon adjacent to the carbonyl group, followed by dehydration with the resulting formation of conjugated unsaturation giving rise to the color. However, the above postulation of the mechanism of color formation is not limiting of the invention herein described.

According to the present invention, the development of a yellow color during the production of polyvinyl alcohol by the alcoholysis of polyvinyl ester, such as polyvinyl acetate, with a lower aliphatic alcohol containing from 2 to 4 carbon atoms, such as ethanol, in the presence of an alkaline catalyst is substantially prevented by having present during the reaction an additive that will react with aldehydes, such as acetaldehyde, under the conditions of the reaction so as to yield a colorless product. When this is done, there is obtained a substantially colorless polyvinyl alcohol that is well suited for a wide variety of uses. A number of methods by which aldehydes may be removed during the alcoholysis of polyvinyl esters are readily apparent. Aldehydic functions may be removed with basic nitrogenous compounds through the formation of aldehyde-ammonia derivatives or reduced to functions inactive under the conditions of the alcoholysis. Aldehydes may be removed by condensation with active methylene compounds or by oxidation to colorless inactive substances.

In carrying out the process of this invention, it is preferred to employ an alcohol containing no more than about 1½% by volume of water as the reaction medium. When an alcohol containing larger quantities of water is employed, the reaction is retarded. This requires that increased amounts of catalyst be used or longer reaction times be employed. The former results in the formation of a polyvinyl alcohol of high ash content which is objectionable in the production of a product suited for a wide variety of uses. The latter is objectionable from a commercial viewpoint. In order to obtain a rapid reaction, it is preferred to employ substantially anhydrous alcohol as the reaction medium. However, in this case it is found that the solubility of the polyvinyl acetate in the anhydrous alcohol is so low as to prevent the formation of a polyvinyl acetate solution of the desired concentration. In this case, the polyvinyl acetate may be dissolved in the substantially anhydrous alcohol at an elevated temperature, of between 50 and 78° C., or there may be admixed with the said alcohol up to about 20% by volume of an auxiliary solvent such as, for example, ethyl acetate, benzene, or methanol, to increase the solubility of the polyvinyl acetate therein. The concentration of the polyvinyl acetate in the reaction medium should be between about 5 and 60% by weight, based on the weight of the solution, although lower and higher concentrations may also be employed. When ethanol is used it may be a commercially pure product or it may be a denatured product.

The alkaline catalyst which causes the alcoholysis to proceed may, for example, be sodium hydroxide, potassium hydroxide, sodium methylate, or sodium ethylate. The amount of such catalyst should be ½ to 3% by weight based on the weight of polyvinyl acetate. All of the catalyst may be added at the outset, or catalyst may be added periodically as the reaction proceeds. The temperature at which the reaction is normally carried out is between about 50 and 60° C., but may be lower if one of the auxiliary solvents mentioned earlier is employed. For the production of a polyvinyl alcohol having a very low acyl content, from about 60 to 90 minutes are normally required for the alcoholysis. It is, of course, also possible to interrupt the alcoholysis at any intermediate stage and thereby obtain a polyvinyl alcohol having a relatively high proportion of acyl groups still linked thereto.

To prevent the formation of a yellow color during the alcoholysis, there is added to the reaction medium an additive that will react with aldehydes so as to give a colorless product. Examples of materials that are suitable for this purpose are: hydrazine, hydroxylamine, butylamine, ethylene diamine, sodium borohydride, diethyl malonate, hydrogen peroxide, urea peroxide, and acetyl peroxide. The amount of additive required will depend upon the precise chemical nature of the additive.

It will also vary with the level of aldehyde encountered in the alcoholysis. Hence, the effective amount may vary widely. In some instances, amounts as small as 0.1% by weight of the weight of the polyvinyl ester may be effective while in others 10 or even 20% by weight may be necessary.

The following examples are given to illustrate this invention further.

*Example I*

There is dissolved in 360 parts by weight of anhydrous denatured ethanol (2B) (containing approximately 30 parts per million of acetaldehyde) 40 parts by weight of 25 centipoises viscosity grade (viscosity of 8.6% benbene solution at 20°C.) polyvinyl acetate (containing 0.14% vinyl acetate monomer) by heating the said solution at 60–78°C. with stirring. The temperature of the solution is adjusted to 60°C. and there is added to the solution with stirring 0.4 part by weight of anhydrous hydrazine and 0.4 part by weight of sodium hydroxide as a solution in anhydrous ethanol containing 0.0147 gram of sodium hydroxide per milliliter of ethanol. The solution gels in 2.5 minutes and the gel is broken by continued stirring and the addition of 40 parts by weight of anhydrous ethanol. After 45 minutes at 55-60° C., there is added to the reaction mixture sufficient acetic acid to make the said mixture neutral to phenolphthalein. The precipitated polyvinyl alcohol is washed several times with 95% ethanol (2B) and dried at 60°C. The product is colorless. When the hydrazine is omitted from the reaction, there is obtained a polyvinyl alcohol having a strong yellow color.

*Example II*

The process of Example I is repeated, employing 4 parts by weight of diethyl malonate in place of the hydrazine. The product obtained has only a very slightly yellow color.

*Example III*

The process of Example I is repeated, employing 0.1 part by weight of sodium borohydride (dissolved in ethanol) in place of the hydrazine. The product obtained is colorless.

It is to be understood that the foregoing detailed description is given merely by way of illustration and that many variations may be made therein without departing from the spirit of our invention.

Having described our invention what we desire to secure by Letters Patent is:

1. A process for the production of polyvinyl alcohol which comprises alcoholizing polyvinyl acetate dissolved in ethanol in the presence of an alkaline alcoholysis catalyst and a basic nitrogenous compound selected from the group consisting of hydrazine, hydroxylamine, butylamine and ethylene diamine that will react with aldehydes under the conditions of the reaction to form a colorless product.

2. A process for the production of polyvinyl alcohol which comprises alcoholizing polyvinyl acetate dissolved in ethanol containing less than about 1½% by volume of water in the presence of an alkaline alcoholysis catalyst and between about 0.1 and 20% by weight based on the weight of the polyvinyl acetate of a basic nitrogenous compound selected from the group consisting of hydrazine, hydroxylamine, butylamine and ethylene diamine that will react with aldehydes under the conditions of the reaction to form a colorless product.

3. A process for the production of polyvinyl alcohol which comprises alcoholizing polyvinyl acetate dissolved in ethanol in the presence of an alkaline alcoholysis catalyst and hydrazine.

References Cited in the file of this patent

UNITED STATES PATENTS

| | | |
|---|---|---|
| 1,973,724 | Perkins et al. | Sept. 18, 1934 |
| 2,642,420 | Kenyon et al. | June 16, 1953 |

OTHER REFERENCES

"The Chemistry of Hydrazine" (Audrieth), published by Wiley & Sons (New York), 1951 (page 226).